(12) United States Patent     (10) Patent No.:   US 12,580,655 B2
Pan et al.                                  (45) Date of Patent:       Mar. 17, 2026

(54) RADIO FREQUENCY TRANSCEIVER, CONNECTION ASSEMBLY FOR RADIO FREQUENCY TRANSCEIVER, AND RADIO FREQUENCY TRANSCEIVER SYSTEM

(71) Applicant: HUAWEI TECHNOLOGIES CO., LTD., Shenzhen (CN)

(72) Inventors: Youbing Pan, Shanghai (CN); Juwang Zhang, Dongguan (CN); Xing Wu, Xi'an (CN); Kang Cao, Shanghai (CN); Wang Xiong, Dongguan (CN); Gezi Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 18/415,733

(22) Filed: Jan. 18, 2024

(65) Prior Publication Data

US 2024/0154700 A1     May 9, 2024

Related U.S. Application Data

(63) Continuation of application No. PCT/CN2022/093559, filed on May 18, 2022.

(30) Foreign Application Priority Data

Jul. 19, 2021    (CN) .......................... 202110814703.8

(51) Int. Cl.
     *H04B 10/2575*      (2013.01)
     *H04B 1/40*         (2015.01)

(52) U.S. Cl.
     CPC ........... *H04B 10/2575* (2013.01); *H04B 1/40* (2013.01)

(58) Field of Classification Search
None
See application file for complete search history.

(56) References Cited

U.S. PATENT DOCUMENTS 7,469,105 B2 * 12/2008 Wake ................... H04B 10/806
                                         398/171
8,019,224 B2 * 9/2011 Karaki ............... H04B 10/2575
                                         398/115

(Continued)

FOREIGN PATENT DOCUMENTS

CN      201270334 Y     7/2009
CN      102377071 A     3/2012

(Continued)

OTHER PUBLICATIONS

Extended European Search Report dated Jul. 22, 2024, issued for European Application No. 22844960.9 (7 pages).

*Primary Examiner* — Jai M Lee

(57)           ABSTRACT

A radio frequency transceiver includes a container. The container includes a circuit board and the connection assembly. A baseband circuit is disposed on the circuit board. The baseband circuit is configured to synthesize the first baseband signal, and decode the second baseband signal. The connection assembly includes a board-end connector, a cable, and at least one optical module interface. The board-end connector is configured to connect to the baseband circuit. A first end of the cable is configured to connect to the at least one optical module interface, and a second end of the cable is configured to connect to the board-end connector. Each optical module interface of the at least one optical module interface is configured to connect to an external optical module. According to the solutions provided by this radio frequency transceiver, a circuit layout can be more flexible, hardware costs can be reduced, and space can be saved.

20 Claims, 10 Drawing Sheets

(56)  References Cited

U.S. PATENT DOCUMENTS

| | | | | |
|---|---|---|---|---|
| 8,260,143 | B2 * | 9/2012 | Gupta | H04B 10/40 |
| | | | | 398/115 |
| 8,682,392 | B2 * | 3/2014 | Gelbman | H04W 88/085 |
| | | | | 455/67.11 |
| 8,817,848 | B2 * | 8/2014 | Lemson | H04B 10/25753 |
| | | | | 375/220 |
| 8,971,712 | B2 * | 3/2015 | Fan | H04B 10/25759 |
| | | | | 398/115 |
| 8,971,824 | B2 * | 3/2015 | Peng | H01Q 1/02 |
| | | | | 343/702 |
| 10,075,779 | B2 * | 9/2018 | Erreygers | H04B 10/25752 |
| 11,310,869 | B2 * | 4/2022 | Vazny | H04B 1/40 |
| 2002/0012495 | A1 * | 1/2002 | Sasai | H04B 10/25754 |
| | | | | 385/24 |
| 2005/0141895 | A1 * | 6/2005 | Ruiz | H04B 10/25758 |
| | | | | 398/115 |
| 2007/0019959 | A1 * | 1/2007 | Retnasothie | H04B 10/25752 |
| | | | | 370/335 |
| 2019/0098699 | A1 | 3/2019 | Vazny et al. | |
| 2019/0190609 | A1 * | 6/2019 | Fernando | H04B 10/25759 |

FOREIGN PATENT DOCUMENTS

| | | | |
|---|---|---|---|
| CN | 208608466 | U | 3/2019 |
| CN | 107113994 | B | 12/2019 |

* cited by examiner

RADIO FREQUENCY TRANSCEIVER, CONNECTION ASSEMBLY FOR RADIO FREQUENCY TRANSCEIVER, AND RADIO FREQUENCY TRANSCEIVER SYSTEM

CROSS-REFERENCE TO RELATED APPLICATIONS

This application is a continuation of International Application No. PCT/CN2022/093559, filed on May 18, 2022, which claims priority to Chinese Patent Application No. 202110814703.8, filed on Jul. 19, 2021. The disclosures of the aforementioned applications are hereby incorporated by reference in their entireties.

TECHNICAL FIELD

This disclosure relates to the field of wireless communication technologies, and in particular, to a radio frequency transceiver, a connection assembly for the radio frequency transceiver, and a radio frequency transceiver system.

BACKGROUND

A radio frequency transceiver used in a wireless communication system supports a multiple-input multiple-output (MIMO) function, and can simultaneously transmit signals to different user equipment through a plurality of transmit antennas, and simultaneously receive, through a plurality of receive antennas, signals sent by a plurality of user equipment.

FIG. 1 is a schematic diagram of a radio frequency transceiver.

An optical module interface 20 and a power interface 30 are disposed at a bottom of a container of a radio frequency transceiver 01, and the power interface 30 is connected to a power module 50 through a junction component 40. The power module 50 is configured to supply power to the radio frequency transceiver 01. The optical module interface 20 includes an optical module cage, configured to connect to an external optical module, so that the optical module converts an electrical signal into an optical signal and transmits the optical signal to an upper-level network module through an optical fiber, where the upper-level network module may be a baseband processing unit (BBU). As shown in the figure, circuits included in a printed circuit board (PCB) 10 are sequentially: a first radio frequency power amplifier circuit 101(A), an intermediate frequency (IF) circuit 102, a second radio frequency power amplifier circuit 101(B), and a baseband circuit 103 from top to bottom.

The first radio frequency power amplifier circuit 101(A) and the second radio frequency power amplifier circuit 101(B) transmit a radio frequency signal through a plurality of transmit antennas, and receive, through a plurality of receive antennas, the radio frequency signal sent by user equipment. The intermediate frequency circuit 102 is configured to implement conversion between an intermediate frequency signal and a baseband signal, signal transmission between the intermediate frequency circuit 102 and the baseband circuit 103, and signal transmission between the baseband circuit 103 and the optical module interface 20, which are implemented through a PCB routing.

Because the baseband circuit 103 and the optical module interface 20 are connected through the PCB routing, and impact of a transmission loss of PCB routing connection is considered, there is a strict requirement on a distance between the baseband circuit 103 and the optical module interface 20, and the baseband circuit 103 needs to be located at the bottom of the container close to the optical module interface 20. This imposes a constraint on a hardware layout inside the radio frequency transceiver. In addition, because the baseband circuit 103 has a high heat emitting power, heat generated during working causes an increase in a surrounding temperature, which causes the optical module interface 20 that is close to the baseband circuit 103 to be burnt, and affects working stability of the optical module interface 20 and the optical module. Therefore, a cooling unit 60 further needs to be introduced, which increases hardware costs and occupies extra layout space.

SUMMARY

To resolve the foregoing problem, this disclosure provides a radio frequency transceiver, a connection assembly for the radio frequency transceiver, and a radio frequency transceiver system, so that a circuit layout can be more flexible, hardware costs can be reduced, and space can be saved.

According to a first aspect, this disclosure provides a radio frequency transceiver, used in a wireless communication system. In a typical application scenario, the radio frequency transceiver is connected to a baseband processing unit through an optical fiber, and the radio frequency transceiver is configured to transmit a first baseband signal and receive a second baseband signal. The radio frequency transceiver includes a container, the container includes a circuit board and a connection assembly, and a baseband circuit is disposed on the circuit board. The baseband circuit is configured to synthesize the first baseband signal, and decode the second baseband signal. The connection assembly includes a board-end connector, a cable, and at least one optical module interface. The board-end connector is configured to connect to the baseband circuit. A first end of the cable is configured to connect to the at least one optical module interface, and a second end of the cable is configured to connect to the board-end connector. Each optical module interface of the at least one optical module interface is configured to connect to an external optical module.

The radio frequency transceiver provided in this disclosure implements an electrical connection between the optical module interface and the baseband circuit through the connection assembly. Because a cable of the connection assembly may have a specific length, the optical module interface and the baseband circuit may be spaced by a specific distance. This overcomes a constraint on a circuit module layout when the optical module interface and the baseband circuit are connected through a transmission line of a circuit board, so that a circuit layout on the circuit board can be more flexible. In addition, because the optical module interface may be spaced from the baseband circuit, and is not in contact with the circuit board, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

In a possible implementation, the optical module interface is disposed at a bottom inside the container, the circuit board is disposed on an upper side of the optical module interface in a vertical direction, the circuit board is divided into a first area, a second area, and a third area from top to bottom in the vertical direction, and the baseband circuit is disposed in the second area.

In this case, the third area is spaced between the optical module interface and the baseband circuit, and a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

In a possible implementation, a first radio frequency power amplifier circuit is disposed in the first area, an intermediate frequency circuit is further disposed in the second area, and a second radio frequency power amplifier circuit is disposed in the third area. The intermediate frequency circuit is configured to: convert the first baseband signal into a first intermediate frequency signal, transmit the first intermediate frequency signal to the first radio frequency power amplifier circuit and the second radio frequency power amplifier circuit, and convert a second intermediate frequency signal sent by the first radio frequency power amplifier circuit and the second radio frequency power amplifier circuit into the second baseband signal. The first radio frequency power amplifier circuit and the second radio frequency power amplifier circuit are configured to convert the first intermediate frequency signal into a first radio frequency signal, and convert a received second radio frequency signal into the second intermediate frequency signal.

In this case, both the intermediate frequency circuit and the baseband circuit are disposed in the second area, to implement a short-distance layout. Therefore, a CDR circuit that provides a relay function may be removed, to reduce costs and save occupied layout space.

In a possible implementation, a quantity of antennas connected to the first radio frequency power amplifier circuit is different from a quantity of antennas connected to the second radio frequency power amplifier circuit. In other words, a size of the first area is correspondingly different from a size of the second area, and may be applied to a scenario in which a wireless communication service requirement is different.

In a possible implementation, the optical module interface is disposed at a bottom inside the container, the circuit board is disposed on an upper side of at least one optical module interface in a vertical direction, the circuit board is divided into a first area, a second area, and a third area from top to bottom in the vertical direction, and an intermediate frequency circuit and a first radio frequency power amplifier circuit are further disposed on the circuit board. The intermediate frequency circuit is configured to: convert the first baseband signal into a first intermediate frequency signal, transmit the first intermediate frequency signal to the first radio frequency power amplifier circuit, and convert a second intermediate frequency signal sent by the first radio frequency power amplifier circuit into the second baseband signal. The first radio frequency power amplifier circuit is configured to convert the first intermediate frequency signal into a first radio frequency signal, and convert the received second radio frequency signal into a second intermediate frequency signal. The first radio frequency power amplifier circuit is disposed in the first area, and the intermediate frequency circuit and the baseband circuit are disposed in the second area.

Because the foregoing idle area is spaced between the optical module interface and the baseband circuit, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

The idle area may be used as a reserved reconstruction area. For example, when a demand for a wireless communication service increases, the second radio frequency power amplifier circuit is correspondingly disposed in the idle area.

In a possible implementation, the optical module interface is disposed at a bottom inside the container, the circuit board is fastened on an upper side of the optical module interface in a vertical direction, the circuit board is divided into a first area and a second area from top to bottom in the vertical direction, the baseband circuit is disposed in the second area, and a lowermost side of the circuit board in the vertical direction is a preset height higher than the optical module interface.

Because the preset height is spaced between the optical module interface and the circuit board, when the preset height is robust, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

In a possible implementation, an intermediate frequency circuit and a first radio frequency power amplifier circuit are further disposed on the circuit board. The intermediate frequency circuit is configured to: convert the first baseband signal into a first intermediate frequency signal, transmit the first intermediate frequency signal to the first radio frequency power amplifier circuit, and convert a second intermediate frequency signal sent by the first radio frequency power amplifier circuit into the second baseband signal. The first radio frequency power amplifier circuit is configured to convert the first intermediate frequency signal into a first radio frequency signal, and convert the received second radio frequency signal into a second intermediate frequency signal. The first radio frequency power amplifier circuit is disposed in the first area, and the intermediate frequency circuit is disposed in the second area.

In a possible implementation, the intermediate frequency circuit and the baseband circuit are connected in the second area through a cable of the circuit board.

Because the baseband circuit and the intermediate frequency circuit are jointly disposed in the second area, the baseband circuit and the intermediate frequency circuit are disposed at a close distance. Even if the baseband circuit and the intermediate frequency circuit are connected through the cable of the circuit board, a requirement of a low transmission loss can be met. Therefore, a CDR circuit with a relay function can be removed, to reduce costs and save occupied layout space.

In a possible implementation, the optical module interface is disposed at a bottom inside the container, the circuit board is disposed on an upper side of the optical module interface in a vertical direction, the circuit board is divided into a first area and a second area from top to bottom in the vertical direction, and the baseband circuit is disposed in the first area.

Because the second area is spaced between the optical module interface and the baseband circuit, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

In a possible implementation, an intermediate frequency circuit and a second radio frequency power amplifier circuit are further disposed on the circuit board. The intermediate frequency circuit is configured to: convert the first baseband signal into a first intermediate frequency signal, transmit the first intermediate frequency signal to the second radio frequency power amplifier circuit, and convert a second intermediate frequency signal sent by the second radio frequency power amplifier circuit into the second baseband signal. The second radio frequency power amplifier circuit is configured to convert the first intermediate frequency signal into a first radio frequency signal, and convert the received second radio frequency signal into a second intermediate frequency signal. The baseband circuit is disposed in the first area, and the second radio frequency power amplifier circuit is disposed in the second area.

In this case, both the intermediate frequency circuit and the baseband circuit are disposed in the first area, to implement a short-distance layout. Therefore, a CDR circuit that provides a relay function may be removed, to reduce costs and save occupied layout space.

In a possible implementation, the intermediate frequency circuit and the baseband circuit are connected in the first area through a cable of the circuit board.

In this case, the intermediate frequency circuit and the baseband circuit are jointly disposed in the first area. The baseband circuit and the intermediate frequency circuit are disposed at a close distance. Even if the baseband circuit and the intermediate frequency circuit are connected through the cable of the circuit board, a requirement of a low transmission loss can be met. Therefore, a CDR circuit with a relay function can be removed, to reduce costs and save occupied layout space.

In a possible implementation, the optical module interface is disposed at a bottom inside the container, the circuit board is disposed on an upper side of the optical module interface in a vertical direction, and a lowermost side of the circuit board in the vertical direction is a preset height higher than the optical module interface.

When the preset height is robust, there is a robust distance interval between the optical module interface and the baseband circuit, and a temperature of a position where the optical module interface is located is slightly affected by the baseband circuit. Therefore, a natural heat dissipation manner may be used, and a cooling unit in the conventional technology is removed, thereby reducing hardware costs and space occupation. In addition, a layout of modules in the circuit board may be the same as a layout of modules in the circuit board of the radio frequency transceiver in the conventional technology. This facilitates reconstruction of the existing radio frequency transceiver and reduces costs of hardware reconstruction.

In a possible implementation, the container of the radio frequency transceiver further includes a power interface and a power module. The power interface and power module are fastened at the bottom inside the container. A first end of the power interface is configured to connect to an external power supply, and a second end of the power interface is configured to connect to the power module. The power module is configured to supply power to each circuit module on the circuit board.

Because the baseband circuit is decoupled from the optical module interface, and the baseband circuit is disposed upward, robust space may be left at the bottom of the container of the radio frequency transceiver, and the power module may be disposed. To be specific, the power module may be disposed at a position close to the power interface. Therefore, a junction component may be removed, a power transmission path may be shortened, loss may be reduced, power leakage may be avoided, and reliability of the power supply is improved.

In a possible implementation, each optical module interface of the at least one optical module interface includes an optical module cage and an input/output connector. Each optical module cage is configured to be externally connected to an optical module. The input/output connector is located in the optical module cage, a first end of the input/output connector is configured to connect to the optical module, and a second end of the input/output connector is configured to connect to the first end of the cable. The input/output connector is configured to perform data transmission between the first end of the cable and the optical module.

In a possible implementation, the connection assembly further includes a fixing plate, and at least one limiting device and at least one first positioning hole are disposed on the fixing plate. The optical module cage is fastened to the fixing plate. The at least one limiting device is configured to fasten the first end of the cable on the fixing plate, or is configured to limit a movement range of the first end of the cable on the fixing plate. The at least one first positioning hole is configured to be combined with a first fastener to fasten the fixing plate to the bottom inside the container, that is, to fasten the optical module interface to the bottom inside the container.

In a possible implementation, the board-end connector includes at least two second positioning holes, a limiting slot is disposed in a position that corresponds to the baseband circuit and that is in the container, and at least one third positioning hole is disposed in the limiting slot. A first part of second positioning holes in the at least two second positioning holes and the at least one third positioning hole are configured to be combined with a second fastener, to limit a movement range of the board-end connector in the limiting slot.

In this case, floating adjustment may be performed on the board-end connector in the limiting slot to an extent, so that a position of the board-end connector can be adjusted when the circuit board and the board-end connector are subsequently positioned.

In a possible implementation, a third fastener is further disposed in an area, in which the baseband circuit is disposed, on the circuit board. The third fastener is configured to be combined with a second part of second positioning holes in the at least two second positioning holes, to limit a movement range of the board-end connector relative to the circuit board.

In a possible implementation, a fourth positioning hole is further disposed in an area, in which the baseband circuit is disposed, on the circuit board. The fourth positioning hole and a second part of second positioning holes in the at least two second positioning holes are configured to be combined with a third fastener, to limit a movement range of the board-end connector relative to the circuit board.

In a possible implementation, at least one fifth positioning hole is further disposed in an area, in which the baseband circuit is disposed, on the circuit board, and the board-end connector further includes at least one sixth positioning hole. The at least one fifth positioning hole and the at least one sixth positioning hole are configured to be combined with a screw to fasten the board-end connector and the circuit board.

In a possible implementation, the board-end connector includes a signal end face, and a signal terminal is disposed on the signal end face. When the board-end connector is fastened to the circuit board, the signal terminal is configured to correspondingly connect to a signal terminal on the circuit board.

The signal terminal of the signal end face may be connected to a signal terminal of the circuit board in a crimping manner, or may be connected in an inserting manner. This is not specifically limited in this disclosure. After the board-end connector and the circuit board are fastened tightly through a screw, the signal terminal on the signal end face can be tightly connected to the signal terminal on the circuit board.

In a possible implementation, a crimping slot is further disposed in the container of the radio frequency transceiver, and the cable of the connection assembly is embedded in the crimping slot. On one hand, cable movement can be restricted, and on the other hand, the cable can be protected.

According to a second aspect, this disclosure further provides a connection assembly for a radio frequency transceiver, where the connection assembly is used in the radio frequency transceiver, and the connection assembly includes a board-end connector, a cable, and at least one optical module interface. A first end of the cable is configured to connect to the at least one optical module interface, and a second end of the cable is configured to connect to the board-end connector. The board-end connector is configured to connect to a baseband circuit on a circuit board of the radio frequency transceiver. Each optical module interface of the at least one optical module interface is configured to connect to an external optical module.

After the radio frequency transceiver system uses the connection assembly provided in this embodiment of this disclosure, a layout constraint of the baseband circuit can be decoupled from that of an optical module cage, so that a layout of the baseband circuit can be more flexible. When a specific distance exists between the baseband circuit and the optical module interface, heat generated by the baseband circuit does not affect working of the optical module inserted into the optical module interface. On one hand, stability of the optical module interface and the optical module is improved, and on the other hand, a cooling unit may be removed, thereby reducing layout space.

In a possible implementation, each optical module interface of the at least one optical module interface includes an optical module cage and an input/output connector. Each optical module cage is configured to be externally connected to an optical module. The input/output connector is located in the optical module cage, a first end of the input/output connector is connected to the optical module, and a second end of the input/output connector is connected to the first end of the cable. The input/output connector is configured to perform data transmission between the first end of the cable and the optical module.

In a possible implementation, the connection assembly further includes a fixing plate, and at least one limiting device and at least one first positioning hole are disposed on the fixing plate. The optical module cage is fastened to the fixing plate. The at least one limiting device is configured to fasten the first end of the cable on the fixing plate, or is configured to limit a movement range of the first end of the cable on the fixing plate. The at least one first positioning hole is configured to be combined with a first fastener to fasten the fixing plate to the bottom inside the container of the radio frequency transceiver.

In a possible implementation, the board-end connector includes at least two second positioning holes. A first part of second positioning holes in the at least two second positioning holes is configured to be combined with a second fastener and at least one third positioning hole disposed in a limiting slot, to limit a movement range of the board-end connector in the limiting slot, where the limiting slot is disposed in a position that corresponds to the baseband circuit and that is in the container.

In a possible implementation, a second part of second positioning holes in the at least two second positioning holes are configured to be combined with a third fastener in an area, in which the baseband circuit is disposed, on the circuit board, to limit a movement range of the board-end connector relative to the circuit board.

In a possible implementation, a second part of second positioning holes in the at least two second positioning holes are configured to be combined with a third fastener and a fourth positioning hole in an area, in which the baseband circuit is disposed, on the circuit board, to limit a movement range of the board-end connector relative to the circuit board.

In a possible implementation, the board-end connector further includes at least one sixth positioning hole.

The at least one sixth positioning hole is configured to be combined with a screw and at least one fifth positioning hole disposed in an area, in which the baseband circuit is disposed, on the circuit board, to fasten the board-end connector and the circuit board.

In a possible implementation, the board-end connector includes a signal end face, and a signal terminal is disposed on the signal end face. When the board-end connector is fastened to the circuit board, the signal terminal is configured to correspondingly connect to a signal terminal on the circuit board.

According to a third aspect, this disclosure further provides a radio frequency transceiver system, including at least one radio frequency transceiver provided in more than one implementation, and further including a baseband processing unit. The baseband processing unit is connected to the at least one radio frequency transceiver through an optical fiber, and the baseband processing unit is generally disposed in an equipment room. The baseband processing unit is configured to process data transmitted by the at least one radio frequency transceiver, and transmit to-be-transmitted data to the at least one radio frequency transceiver.

The radio frequency transceiver of the radio frequency transceiver system implements an electrical connection between the optical module interface and the baseband circuit through a connection assembly. Because a cable may have a specific length, the optical module interface and the baseband circuit may be spaced by a specific distance. This overcomes a constraint on a circuit module layout when the optical module interface and the baseband circuit are connected through a board-level transmission line of a circuit board, so that a circuit layout on the circuit board can be more flexible. Because the optical module interface may be spaced from the baseband circuit, and is not in contact with the circuit board, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

Further, the baseband circuit and the intermediate frequency circuit may be further disposed at a close distance.

In this case, even if the baseband circuit and the intermediate frequency circuit are connected through the cable of the circuit board, a requirement of a low transmission loss can be met. Therefore, a CDR circuit with a relay function can be removed, to reduce costs and save occupied layout space. In addition, because the baseband circuit is decoupled from the optical module interface, and the baseband circuit is disposed upward, robust space may be left at the bottom of the container of the radio frequency transceiver for disposing, and the power module may be disposed. To be specific, the power module may be disposed at a position close to the power interface. Therefore, a junction component may be removed, a power transmission path may be shortened, loss may be reduced, power leakage may be avoided, and reliability of the power supply is improved.

DESCRIPTION OF EMBODIMENTS

To enable a person skilled in the art to better understand the technical solutions provided in the embodiments of this disclosure, the following first describes an application scenario of the technical solutions provided in this disclosure.

Figure 2:
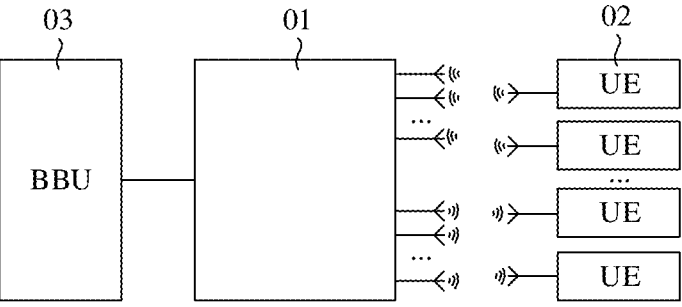
FIG. 2 is a schematic diagram of an application scenario of a radio frequency transceiver according to this disclosure.

FIG. 2 is a schematic diagram of an application scenario of a radio frequency transceiver according to this disclosure.

In a wireless communication system, a radio frequency transceiver 01 supports a MIMO function, and the radio frequency transceiver 01 includes a plurality of receive antennas and a plurality of transmit antennas. The plurality of receive antennas can simultaneously receive information sent by a plurality of user equipment (UE), and the plurality of transmit antennas can simultaneously send information to a plurality of UEs 02. In some embodiments, a specific type of the UE 02 includes but is not limited to a mobile phone, a smart terminal, a multimedia device, a streaming media device, an in-vehicle device, a smart wearable device, and the like.

The radio frequency transceiver 01 communicates with an upper-level network module through an optical fiber. In some embodiments, the upper-level network module is a BBU 03, the BBU 03 is generally disposed in an equipment room, and one BBU may be connected to one or more radio frequency transceivers 01.

With continued reference to an internal structure of the container of the radio frequency transceiver 01 shown in FIG. 1, the architecture imposes strict constraints on a layout of each part of the circuit, and layout architecture features are as follows.

An optical module interface 20 and a power interface 30 that are used as external interfaces are disposed at a bottom of the container.

A high-speed signal between a baseband circuit 103 and the optical module interface 20 is connected through a PCB-level transmission line. Considering impact of a transmission loss of the PCB-level transmission line, there is a strict distance requirement between a baseband circuit 103 and the optical module interface 20, that is, the baseband circuit 103 needs to be located at the bottom of the container close to the optical module interface 20. Because the baseband circuit 103 has high heat emitting power, a cooling unit 60 further needs to be disposed to cool the optical module interface 20.

The intermediate frequency circuit 102 and the baseband circuit 103 are deployed remotely, and the intermediate frequency circuit 102 and the baseband circuit 103 are connected through the PCB-level transmission line. To reduce a transmission loss on the PCB-level transmission line, clock and data recovery circuit (CDR) circuits 104(A) and 104(B) with a relay function need to be introduced, and costs of the CDR circuit are high.

Relative positions of the baseband circuit 103 and the optical module interface 20 are restricted, and the baseband circuit 103 occupies the bottom of the entire container. Therefore, the power module 50 can only be disposed on the top of the container, and the power interface 30 is connected to the power module 50 through a junction component 40.

Because the foregoing layout architecture requires that the baseband circuit 103 to be located at the bottom of the container close to the optical module interface 20, a hardware layout inside the radio frequency transceiver is restricted. In addition, because the baseband circuit 103 has high heat emitting power, a surrounding temperature increases when the baseband circuit 103 is working. Consequently, the optical module interface 20 that is close to the baseband circuit 103 is burnt. To ensure normal working of the optical module interface 20 and the optical module, the cooling unit 60 needs to be introduced. Therefore, hardware costs are further increased, and layout space is occupied. In addition, even if the cooling unit is disposed, stability of the optical module interface 20 and the optical module during working may still be affected.

To resolve the foregoing technical problem, this disclosure provides a radio frequency transceiver, a connection assembly for the radio frequency transceiver, and a radio frequency transceiver system. A container of the radio frequency transceiver includes the connection assembly, and the connection assembly includes a board-end connector, a cable, and at least one optical module interface. The board-end connector is configured to connect to the baseband circuit. A first end of the cable is configured to connect to the at least one optical module interface, and a second end of the cable is configured to connect to the board-end connector. Each optical module interface of the at least one optical module interface is configured to connect to an external optical module. An electrical connection between the optical module interface and the baseband circuit is implemented by using the connection assembly. Because a cable may have a specific length, the optical module interface and the baseband circuit may be spaced by a specific distance. This overcomes a constraint on a circuit module layout when the optical module interface and the baseband circuit are connected through a PCB-level transmission line, so that a circuit layout on the PCB can be more flexible. Because the optical module interface may be spaced from the baseband circuit, and is not in contact with the PCB, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation. This ensures stability of the optical module interface and the optical module during working.

To make a person skilled in the art understand the technical solutions in this disclosure better, the following describes the technical solutions in embodiments of this disclosure with reference to the accompanying drawings in embodiments of this disclosure.

Terms such as "first" and "second" in the descriptions of this disclosure are used only for the purpose of description and cannot be understood as indicating or implying relative importance or implicitly indicating a quantity of technical features indicated.

In addition, in this disclosure, orientation terms such as "up" and "down" may include but are not limited to orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In this disclosure, unless otherwise expressly specified and limited, a term "connection" should be understood in a broad sense. For example, the connection may be a fastened connection, a detachable connection, or an integral connection, or may be a direct connection or an indirect connection based on an intermediate medium.

The PCB in the following description of this disclosure is the circuit board in the container of the radio frequency transceiver.

The radio frequency power amplifier circuit, the intermediate frequency circuit, and the baseband circuit in the container of the radio frequency transceiver may be disposed on a same PCB, or may be disposed on different PCBs. This is not specifically limited in this embodiment of this disclosure. In the following embodiments, an example in which the radio frequency power amplifier circuit, the intermediate frequency circuit, and the baseband circuit are disposed on the same PCB is used for description.

Figure 3:
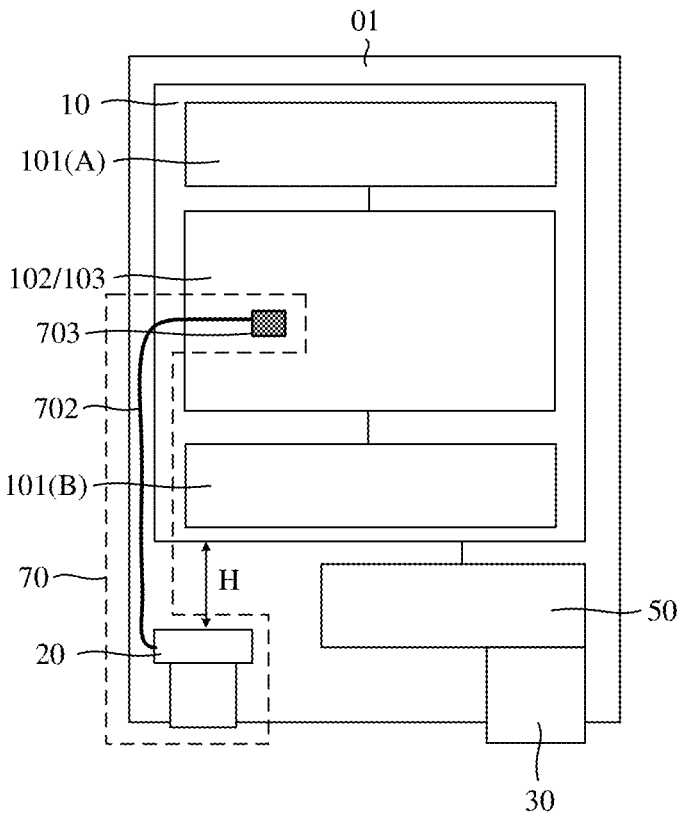
FIG. 3 is a schematic diagram of a radio frequency transceiver according to an embodiment of this disclosure.

FIG. 3 is a schematic diagram of a radio frequency transceiver 01 according to an embodiment of this disclosure.

The radio frequency transceiver includes a container, and the container includes a PCB 10 and a connection assembly 70. A baseband circuit 103 is disposed on the PCB 10.

The baseband circuit 103 is configured to synthesize a to-be-transmitted first baseband signal, and decode a received second baseband signal. A specific implementation and a function of the baseband circuit 103 are mature technologies, and are not specifically described herein in this embodiment of this disclosure.

The connection assembly includes a board-end connector 703, a cable 702, and at least one optical module interface 20.

The board-end connector 703 is configured to connect to the baseband circuit 103.

A first end of the cable 702 is configured to connect to the at least one optical module interface 20, and a second end of the cable is configured to connect to the board-end connector 703. A material and an implementation of the cable 702 are not specifically limited in this embodiment of this disclosure. In a implementation, the cable 702 should have a low transmission loss and high electromagnetic shielding performance.

Each optical module interface 20 is used to connect to an external optical module. The optical module generally includes parts such as an optoelectronic device, a functional circuit, and an interface. The optical module may convert an electrical signal transmitted through the cable 702 into an optical signal, transmit the optical signal to an upper-level network module through an optical fiber, convert an optical signal transmitted by the upper-level network module through the optical fiber into an electrical signal, and transmit the electrical signal to the baseband circuit 103 through the cable 702 and the board-end connector 703.

The radio frequency transceiver provided in this embodiment of this disclosure implements an electrical connection between the optical module interface and the baseband circuit by using the connection assembly. Because a cable may have a specific length, the optical module interface and the baseband circuit may be spaced by a specific distance. This overcomes a constraint on a circuit module layout when the optical module interface and the baseband circuit are connected through a PCB-level transmission line, so that a circuit layout on the PCB can be more flexible. Because the optical module interface may be spaced from the baseband circuit, and is not in contact with the PCB, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

The following provides description with reference to a specific implementation of the radio frequency transceiver. A typical application scenario of the radio frequency transceiver in the following description is used in a fifth generation mobile communication technology (5G) wireless communication system.

Figure 4:
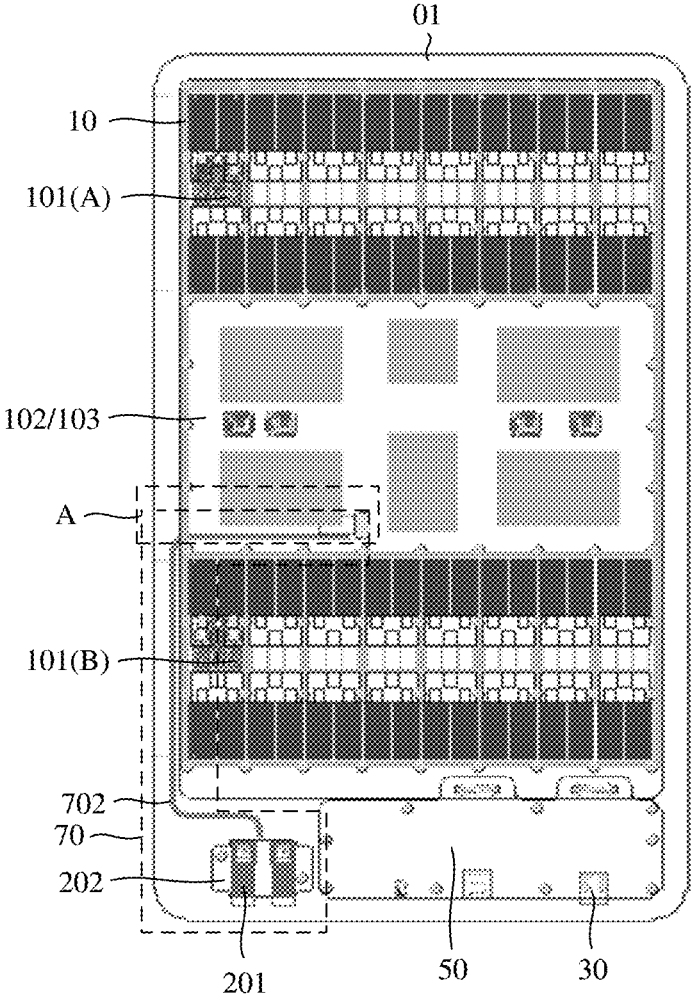
FIG. 4 is a schematic diagram of another radio frequency transceiver according to an embodiment of this disclosure.

FIG. 4 is a schematic diagram of another radio frequency transceiver 01 according to an embodiment of this disclosure.

The figure is a front view of a container of a radio frequency transceiver 01 after the container is opened. A PCB 10 is fastened inside the container in a vertical direction, and is fastened above an optical module interface. The container includes a first radio frequency power amplifier circuit 101(A), a second radio frequency power amplifier circuit 101(B), an intermediate frequency circuit 102, a baseband circuit 103, a power interface 30, a power module 50, and a connection assembly 70.

The first radio frequency power amplifier circuit 101(A) and the second radio frequency power amplifier circuit 101(B) shown in the figure are configured to convert a first intermediate frequency signal into a first radio frequency signal, and convert a received second radio frequency signal into a second intermediate frequency signal.

The intermediate frequency circuit 102 is configured to: convert a first baseband signal into the first intermediate frequency signal, then transmit the first intermediate frequency signal to the first radio frequency power amplifier circuit (A) and the second radio frequency power amplifier circuit (B), and convert the second intermediate frequency signal sent by the first radio frequency power amplifier circuit (A) and the second radio frequency power amplifier circuit (B) into a second baseband signal.

The baseband circuit 103 is configured to synthesize a to-be-transmitted first baseband signal, and decode a received second baseband signal.

The PCB is divided into a first area, a second area, and a third area from top to bottom in a vertical direction. The first radio frequency power amplifier circuit (A) is disposed in the first area, the intermediate frequency circuit 102 and the baseband circuit 103 are disposed in the second area, and the second radio frequency power amplifier circuit (B) is disposed in the third area.

An antenna interface position of the radio frequency transceiver generally corresponds to a position of the radio frequency power amplifier circuit. When an antenna interface is disposed at the corresponding position of the radio frequency power amplifier circuit, a plurality of antennas may form at least one antenna array, and the radio frequency power amplifier circuit is connected to the at least one antenna array through the antenna interface. In this case, the radio frequency power amplifier circuit receives or sends a signal by using the at least one connected antenna array, that is, the radio frequency power amplifier circuit starts to work. At least one of the first radio frequency power amplifier circuit 101(A) and the second radio frequency power amplifier circuit 101(B) in this embodiment of this disclosure starts to work.

The connection assembly 70 in the following description of this disclosure is disposed at a rear of the PCB 10, that is, a rear side of the PCB 10.

Figure 5:
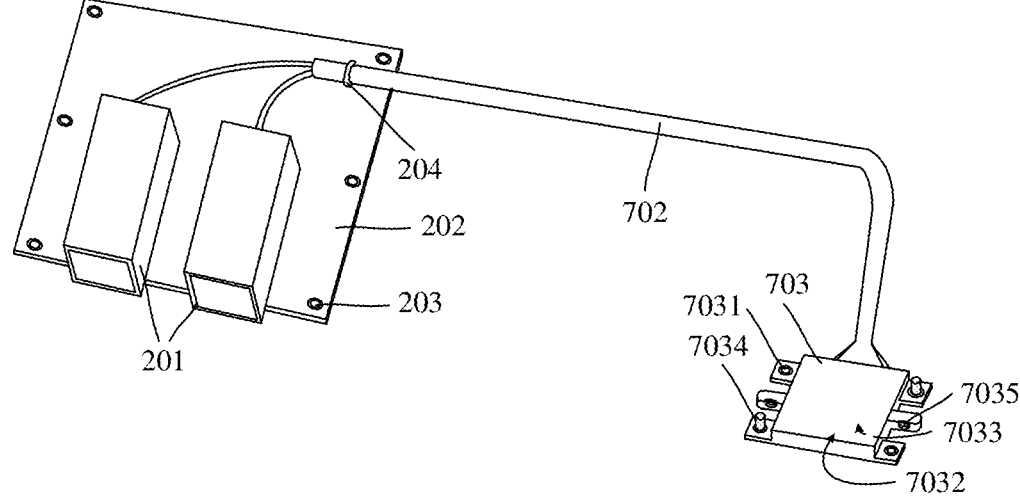
FIG. 5 is a schematic diagram of a connection assembly for a radio frequency transceiver according to an embodiment of this disclosure.

FIG. 5 is a schematic diagram of a connection assembly for a radio frequency transceiver according to an embodiment of this disclosure.

The connection assembly 70 for the radio frequency transceiver in FIG. 5 includes a fixing plate 202, a limiting device 204, a cable 702, a board-end connector 703, and at least one optical module cage 201.

FIG. 5 is described by using an example in which the connection assembly includes two optical module cages 201. The optical module cage 201 further includes an input/output (I/O) connector (not shown in the figure).

Each optical module cage 201 is configured to connect to an external optical module.

The I/O connector is located in the optical module cage 201, a first end of the I/O connector is configured to connect to the optical module, and a second end of the I/O connector is configured to connect to a first end of the cable 702.

The I/O connector is configured to implement data transmission between the first end of the cable 702 and the optical module.

After the optical module is inserted into the optical module cage 201, a first end of the optical module is connected to an I/O connector in the optical module cage

201, and a second end of the optical module is connected to an upper-level network module through an optical fiber.

The optical module may convert an electrical signal transmitted through the cable 702 into an optical signal, transmit the optical signal to the upper-level network module through an optical fiber, convert an optical signal transmitted by the upper-level network module through the optical fiber into an electrical signal, and transmit the electrical signal to the baseband circuit through the cable 702 and the board-end connector 703.

The first end of the cable 702 is connected to each optical module cage 201, and a second end of the cable 702 is connected to the board-end connector 703.

The limiting device 204 is configured to limit the cable 702. In a possible implementation, the limiting device 204 is configured to fasten a first end side of the cable 702 to the fixing plate 202, to prevent the first end side of the cable 702 from moving, and improve stability of a connection between the cable 702 and each optical module cage 201. In another possible implementation, the limiting device 204 performs coarse positioning on the first end of the cable 702, and a width of the limiting device 204 is greater than a diameter of the cable 70. In this case, the cable 702 passes through the limiting device 204, and the cable 702 can only be moved within a small range.

One or more limiting devices 204 may be disposed. A specific quantity of limiting devices 204 is not limited in this embodiment of this disclosure.

The optical module cage 201 is disposed on the fixing plate 202, and a first positioning hole 203 is further disposed on the fixing plate 202. A fastener such as a screw or a pin is combined with the first positioning hole 203, to fasten the fixing plate 202 at the bottom inside a container of the radio frequency transceiver. A specific quantity of first positioning holes 203 is not limited in this embodiment of this disclosure.

A second positioning hole 7031 is further disposed on the board-end connector 703. The second positioning hole 7031 is configured to limit a relative position between the board-end connector 703 and the container, and is configured to limit a relative position between the board-end connector 703 and a PCB.

The optical module cage 201 and the fixing plate 202 in this embodiment of this disclosure are fastened at the bottom of the container of the radio frequency transceiver. Specific fastening positions are not limited in this embodiment of this disclosure.

The cable 702 is a low-loss transmission line and has good electromagnetic shielding performance. Because the cable 702 may have a specific length, the optical module cage 201 and the baseband circuit may be connected in a long distance, that is, a layout constraint of the baseband circuit and the optical module interface is decoupled, so that a layout of the baseband circuit may be more flexible. When a specific distance exists between the baseband circuit and the optical module interface, heat of the baseband circuit does not affect normal working of the optical module interface. In other words, normal working of the optical module cage and the optical module is not affected. On one hand, stability of the optical module cage and the optical module is improved, and on the other hand, the cooling unit may be removed, thereby reducing hardware costs and saving layout space.

Figure 1:
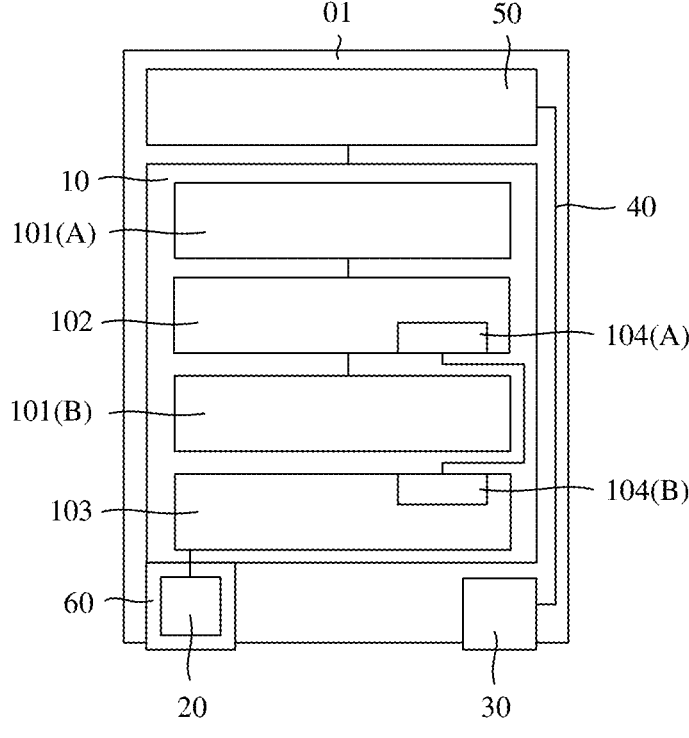
FIG. 1 is a schematic diagram of a radio frequency transceiver.

With continued reference to the layout architecture shown in FIG. 1, problems existing in the architecture further include: The CDR circuits 104(A) and 104(B) with a relay function increase hardware costs and occupy extra container space. The power module 50 is located at the top of the container. The power interface 30 is located at the bottom of the container, and needs to be connected by using an external junction component 40. The use of the junction component 40 also increases costs, and further causes problems such as power loss increase and power leakage. This affects reliability. The following describes a manner of resolving the foregoing problems in the technical solutions of this disclosure.

After the connection assembly shown in FIG. 5 is used, a layout constraint of the baseband circuit and the optical module interface is decoupled. Therefore, the baseband circuit and the optical module interface may be disposed at a remote distance, and the baseband circuit and the intermediate frequency circuit may be disposed at a close distance. For details, refer to the implementation shown in FIG. 4. The baseband circuit and the intermediate frequency circuit are jointly disposed in the second area of the PCB 10. In this case, the baseband circuit 103 and the intermediate frequency circuit 102 are disposed at the close distance. Even if the baseband circuit 103 and the intermediate frequency circuit 102 are connected through a cable of the PCB, a requirement for a low transmission loss can be met. Therefore, a CDR circuit with a relay function can be removed, to reduce costs and save occupied layout space.

In addition, because the baseband circuit 103 is decoupled from the optical module interface, and the baseband circuit 103 is disposed upward, robust space may be left at the bottom of the container of the radio frequency transceiver, and the power module 50 may be disposed. To be specific, the power module 50 may be disposed at a position close to the power interface 30. Therefore, a junction component may be removed, a power transmission path may be shortened, loss may be reduced, power leakage may be avoided, and reliability of the power supply is improved.

The following specifically describes a disposing manner of the connection assembly.

Figure 6:
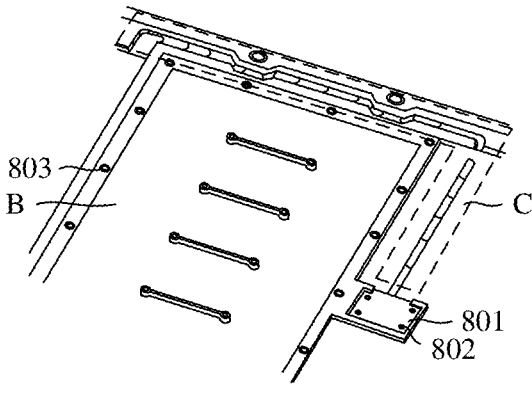
FIG. 6 is a schematic diagram of an area A in FIG. 4 according to an embodiment of this disclosure.

FIG. 6 is a schematic diagram of an area A in FIG. 4 according to an embodiment of this disclosure.

FIG. 6 shows an enlarged scenario of the area A in FIG. 4 when no PCB 10 is disposed in the container. An area B in FIG. 6 corresponds to the third area in FIG. 4, and is configured to dispose the second radio frequency power amplifier circuit 101(B).

An area C in FIG. 6 is a crimping slot. The cable 702 of the connection assembly shown in FIG. 5 is embedded into the crimping slot in a track of the crimping slot. On one hand, movement of the cable can be limited, and on the other hand, the cable can be protected. In an actual application, an embedding form, a bending shape, and a bending direction of the cable 702 are not limited to the manners shown in the accompanying drawings.

The container includes a limiting slot 801 and a third positioning hole 802.

The limiting slot 801 is configured to dispose a board-end connector 703.

A specific quantity of third positioning holes 802 is not limited in this embodiment of this disclosure. In a possible implementation, a quantity of third positioning holes 802 is the same as a quantity of second positioning holes 7031 disposed on the board-end connector 703. In another possible implementation, the quantity of third positioning holes 802 is the same as a quantity of a first part of second positioning holes 7031 on the board-end connector 703, that is, the quantity of third positioning holes 802 is less than the quantity of second positioning holes 7031.

The board-end connector 703 in FIG. 5 includes a non-signal end face 7032 and a signal end face 7033. The non-signal end face 7032 is opposite to the signal end face 7033.

The non-signal end face 7032 does not include a signal terminal, and is configured to contact the limiting slot 801.

The signal end face 7033 includes a signal terminal, and is configured to connect to a signal terminal on the PCB, to implement connection to the baseband circuit.

The non-signal end face 7032 of the board-end connector 703 is fastened to the limiting slot 801 on the container through a second fastener 7034. A quantity and a type of the second fastener 7034 are not specifically limited in this embodiment of this disclosure. For example, two second fasteners 7034 may be disposed, and a specific type is a pin.

The second fastener 7034 is inserted into both the second positioning hole 7031 and the third positioning hole 802. In this case, the second fastener 7034 performs loose limiting on the non-signal end face 7032 and the limiting slot 801, to preliminarily restrict the board-end connector 703. The board-end connector 703 may move in a small range on the limiting slot 801, to adjust a position of the board-end connector 703 based on a requirement.

In actual application, the second fastener 7034 is inserted into the first part of the second positioning holes 7031 of the plurality of second positioning holes 7031, to limit a relative position between the board-end connector 703 and the limiting slot 801.

When the PCB is installed in the container, the PCB is fastened to the container by using a fastener through a mounting hole on the PCB and a fifth positioning hole 803 disposed in the container. In this case, the fastener may be a pin, a screw, or the like. This is not specifically limited in this embodiment of this disclosure.

Then, the PCB is fixed and connected to the signal end face 7033 of the board-end connector 703, which is specifically described in the following.

With continued reference to FIG. 5, when the non-signal end face 7032 of the board-end connector 703 is fastened to the limiting slot 801, the first part of the second positioning holes 7031 is occupied, and is used to insert the second fastener 7034 in the foregoing description, to limit a movement range of the board-end connector 703 in the limiting slot 801. The remaining second part of the second positioning holes 7031 is not occupied. The board-end connector 703 and the limiting slot 801 are not directly fastened, so that the position of the board-end connector 703 can be adjusted when the PCB and the board-end connector 703 are subsequently positioned.

The remaining second part of the second positioning hole 7031 is used to limit a relative position between the PCB and the signal end face 7033.

In a possible implementation, a third fastener is disposed on the PCB. The third fastener on the PCB is combined with an unoccupied second positioning hole 7031 on the board-end connector 703, to limit a movement range of the PCB relative to the board-end connector 703.

In another possible implementation, a fourth positioning hole is disposed on the PCB. After the fourth positioning hole on the PCB is aligned with the unoccupied second positioning hole 7031 on the connection assembly 703, the third fastener is inserted into the two positioning holes, to limit a movement range of the board-end connector relative to the PCB. A quantity of fourth positioning holes is not specifically limited in this embodiment of this disclosure.

A specific type of the third fastener is not limited in this embodiment of this disclosure. For example, the third fastener may be a pin or a screw.

A signal terminal is disposed on the signal end face 7033, and when the board-end connector 703 is fastened to the PCB, the signal terminal is configured to correspondingly connect to the signal terminal on the PCB.

In some embodiments, the signal terminal of the signal end face 7033 is connected to the signal terminal of the PCB in a crimping manner. To ensure reliability of a connection between the signal terminal of the signal end face 7033 and the signal terminal of the PCB, the foregoing third fastener is a screw, and the signal terminals on the two sides are fastened through the screw.

In some other embodiments, the signal terminal of the signal end face 7033 is connected to the signal terminal of the PCB in an inserting manner. For example, the signal terminal of the signal end face 7033 is a male end, and the signal terminal of the PCB is a female end; or the signal terminal of the signal end face 7033 is a female end. The male end and the female end are correspondingly connected in an inserting manner.

In still other possible implementations, at least one fifth positioning hole is further disposed in an area, in which the baseband circuit is disposed, on the PCB, and the board-end connector further includes at least one sixth positioning hole 7035. The fifth positioning hole and the sixth positioning hole 7035 are configured to be combined with a screw to fasten the board-end connector and the PCB. After the board-end connector and the PCB are fastened tightly by using the screw, the signal terminal on the signal end face 7033 can be tightly connected to the signal terminal on the PCB.

In conclusion, the radio frequency transceiver provided in this embodiment of this disclosure implements an electrical connection between the optical module interface and the baseband circuit through the connection assembly. Because a cable of the connection assembly may have a specific length, a constraint on a circuit module layout when the optical module interface is connected to the baseband circuit through a PCB-level transmission line is overcome, so that a circuit layout on the PCB can be more flexible. Because the optical module interface may be spaced from the baseband circuit, and is not in contact with the PCB, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation. In addition, because the baseband circuit may be disposed close to the intermediate frequency circuit, a loss requirement can be met even if a cable of the PCB is used. Therefore, a CDR circuit that functions as a relay may be removed, to reduce hardware costs. In addition, the power module may be disposed at a position close to the power interface, so that a junction component in the conventional technology can be removed, a power transmission path can be shortened, a loss can be reduced, power leakage can be avoided, and reliability of the power supply can be improved.

An example in which the radio frequency transceiver in the foregoing description includes two radio frequency power amplifier circuits, and each radio frequency power amplifier circuit is connected to a same quantity of antennas is used for description. The following describes another implementation of the radio frequency transceiver.

Figure 7A:
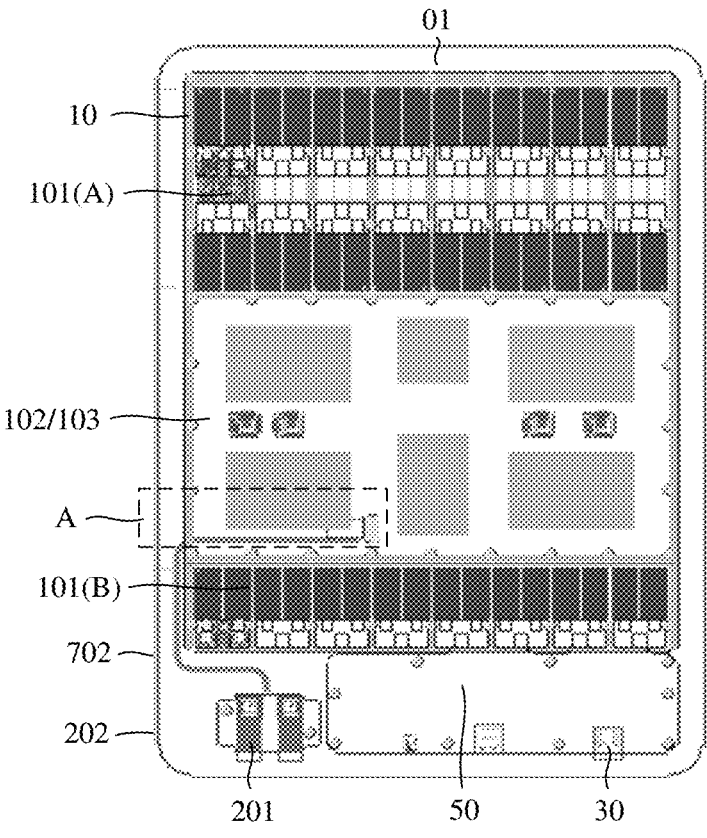
FIG. 7A is a schematic diagram of still another radio frequency transceiver according to an embodiment of this disclosure.

FIG. 7A is a schematic diagram of still another radio frequency transceiver 01 according to an embodiment of this disclosure.

The radio frequency transceiver shown in FIG. 7A includes two radio frequency power amplifier circuits. A difference from FIG. 4 lies in that: a quantity of antennas connected to the second radio frequency power amplifier circuit 101(B) is half of a quantity of antennas connected to the first radio frequency power amplifier circuit 101(A).

The intermediate frequency circuit 102 is configured to: convert a first baseband signal into the first intermediate frequency signal, transmit the first intermediate frequency signal to the first radio frequency power amplifier circuit 101(A) and the second radio frequency power amplifier circuit 101(B), and convert the second intermediate frequency signal sent by the first radio frequency power amplifier circuit 101(A) and the second radio frequency power amplifier circuit 101(B) into a second baseband signal.

The first radio frequency power amplifier circuit 101(A) and the second radio frequency power amplifier circuit 101(B) are configured to convert a first intermediate frequency signal into a first radio frequency signal, and convert a received second radio frequency signal into a second intermediate frequency signal.

The optical module interface is disposed at a bottom inside the container, a PCB 10 is disposed on an upper side of the optical module interface in a vertical direction, and the PCB 10 is divided into a first area, a second area, and a third area from top to bottom in the vertical direction.

The first radio frequency power amplifier circuit 101(A) is disposed in the first area, the intermediate frequency circuit 102 and the baseband circuit 103 are disposed in the second area, and the second radio frequency power amplifier circuit 101(B) is disposed in the third area.

In this case, the radio frequency transceiver may be used in a scenario in which a requirement for a wireless communication service is small. In addition, because the second radio frequency power amplifier circuit 101(B) is spaced between the optical module interface and the baseband circuit 103, a temperature of a position of the optical module interface is slightly affected by the baseband circuit. Therefore, a natural heat dissipation manner may be used, a cooling unit in the conventional technology is removed, hardware costs are reduced, and space occupation is reduced.

Figure 7B:
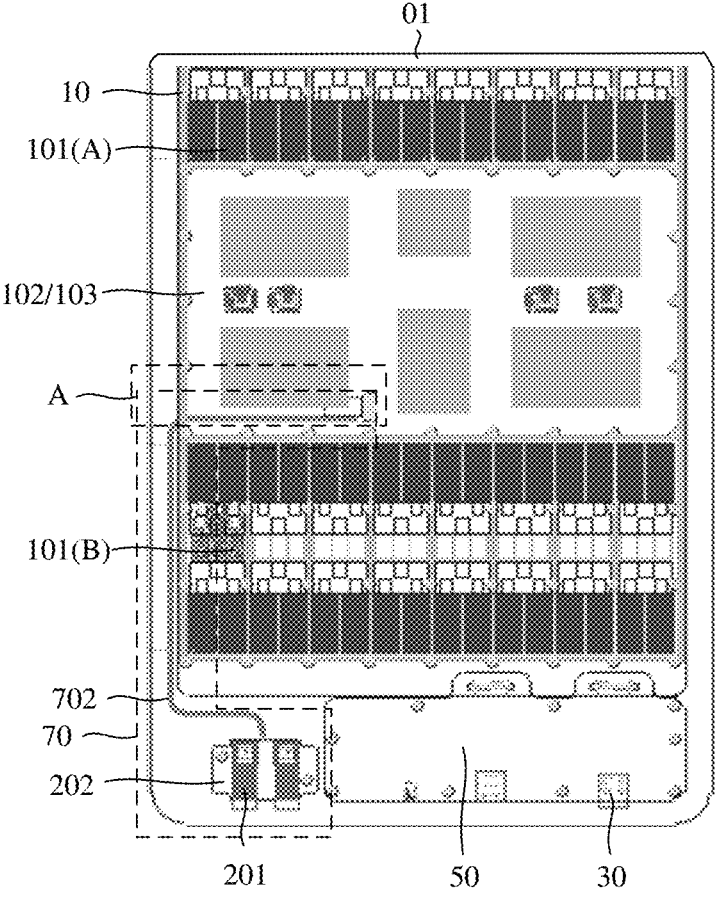
FIG. 7B is a schematic diagram of yet another radio frequency transceiver according to an embodiment of this disclosure.

Further, refer to a schematic diagram of yet another radio frequency transceiver 01 shown in FIG. 7B.

A difference between the radio frequency transceiver shown in FIG. 7B and FIG. 7A lies in that: a quantity of antennas connected to the first radio frequency power amplifier circuit 101(A) is half of a quantity of antennas connected to the second radio frequency power amplifier circuit 101(B). Other implementations are similar to the foregoing descriptions, and details are not described herein again.

The following continues to describe another implementation of the radio frequency transceiver.

Figure 8:
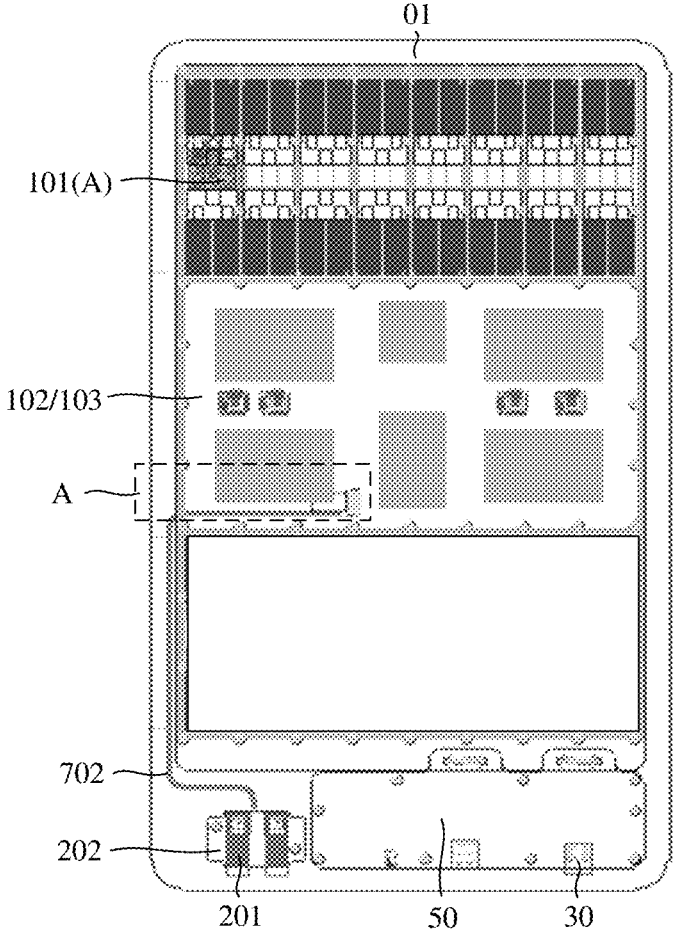
FIG. 8 is a schematic diagram of still yet another radio frequency transceiver according to an embodiment of this disclosure.

FIG. 8 is a schematic diagram of still yet another radio frequency transceiver 01 according to an embodiment of this disclosure.

The optical module interface is disposed at a bottom inside the container, a PCB 10 is disposed on an upper side of the optical module interface in a vertical direction, and the PCB 10 is divided into a first area, a second area, and a third area from top to bottom in the vertical direction.

The first radio frequency power amplifier circuit 101(A) is disposed in the first area, and the intermediate frequency circuit 102 and the baseband circuit 103 are disposed in the second area. A difference between the radio frequency transceiver shown in FIG. 8 and FIG. 4 lies in that: the radio frequency transceiver includes only the first radio frequency power amplifier circuit 101(A), and an area in which the original second radio frequency power amplifier circuit 101(B) is located is idle.

The intermediate frequency circuit 102 converts a first baseband signal into the first intermediate frequency signal, transmits the first intermediate frequency signal to the first radio frequency power amplifier circuit 101(A), and converts the second intermediate frequency signal sent by the first radio frequency power amplifier circuit 101(A) into a second baseband signal.

The first radio frequency power amplifier circuit 101(A) is configured to convert the first intermediate frequency signal into a first radio frequency signal, and convert the received second radio frequency signal into a second intermediate frequency signal.

In this case, the radio frequency transceiver shown in FIG. 8 supports a half of the radio frequency transceiver shown in FIG. 4 to be connected to an antenna, and may be used in a scenario in which a requirement for a wireless communication service is small. In addition, because the foregoing idle area is spaced between the optical module interface and the baseband circuit 103, a temperature of a position of the optical module interface is slightly affected by the baseband circuit. Therefore, a natural heat dissipation manner may be used, a cooling unit in the conventional technology is removed, hardware costs are reduced, and space occupation is reduced.

The idle area may be used as a reserved reconstruction area. For example, when a demand for a wireless communication service increases, the second radio frequency power amplifier circuit 101(B) is correspondingly disposed in the idle area.

Figure 9:
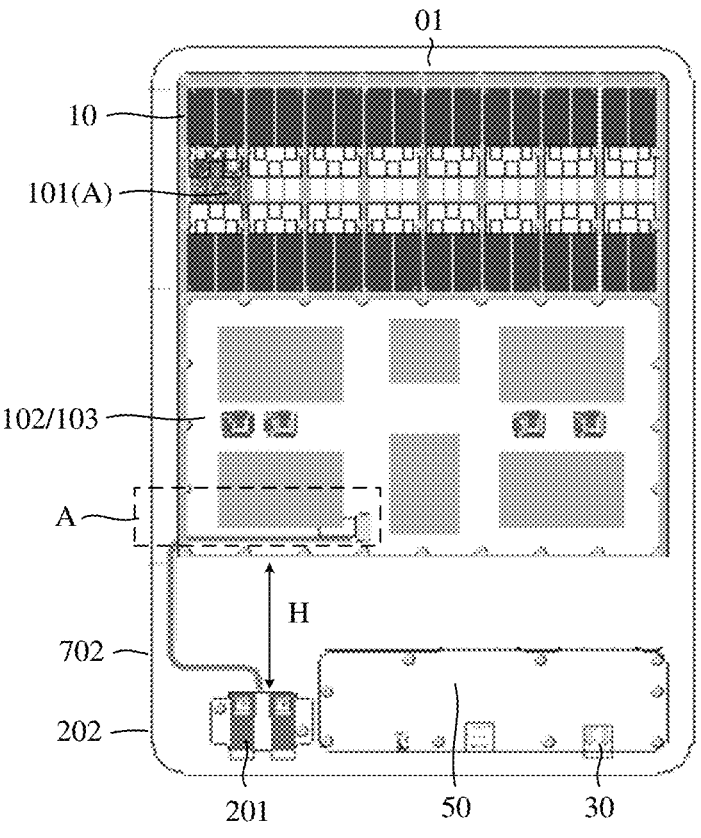
FIG. 9 is a schematic diagram of a further radio frequency transceiver according to an embodiment of this disclosure.

FIG. 9 is a schematic diagram of further another radio frequency transceiver 01 according to an embodiment of this disclosure.

A PCB 10 is disposed on an upper side of the optical module interface in a vertical direction, and the PCB 10 is divided into a first area and a second area from top to bottom in the vertical direction. A first radio frequency power amplifier circuit (A) is disposed in the first area, and an intermediate frequency circuit 102 and a baseband circuit 103 are disposed in the second area.

The intermediate frequency circuit 102 converts a first baseband signal into a first intermediate frequency signal, transmits the first intermediate frequency signal to a first radio frequency power amplifier circuit (A), and converts a second intermediate frequency signal sent by the first radio frequency power amplifier circuit (A) into a second baseband signal.

The first radio frequency power amplifier circuit (A) is configured to convert the first intermediate frequency signal into a first radio frequency signal, and convert the received second radio frequency signal into a second intermediate frequency signal.

A lowermost side of the PCB 10 in the vertical direction is a preset height H higher than the optical module interface. The preset height is not specifically limited in this embodiment of this disclosure. In actual application, the preset height should meet a requirement that the baseband circuit 103 has little impact on an ambient temperature of the optical module interface.

In this case, the radio frequency transceiver shown in FIG. 9 supports a half of the radio frequency transceiver shown in FIG. 4 to be connected to an antenna, and may be used in a scenario in which a requirement for a wireless communication service is small. In addition, because a robust distance interval exists between the optical module interface and the baseband circuit 103, a temperature of a position of the optical module interface is slightly affected by the baseband circuit. Therefore, a natural heat dissipation manner may be used, a cooling unit in the conventional technology is removed, hardware costs are reduced, and space occupation is reduced.

Figure 10:
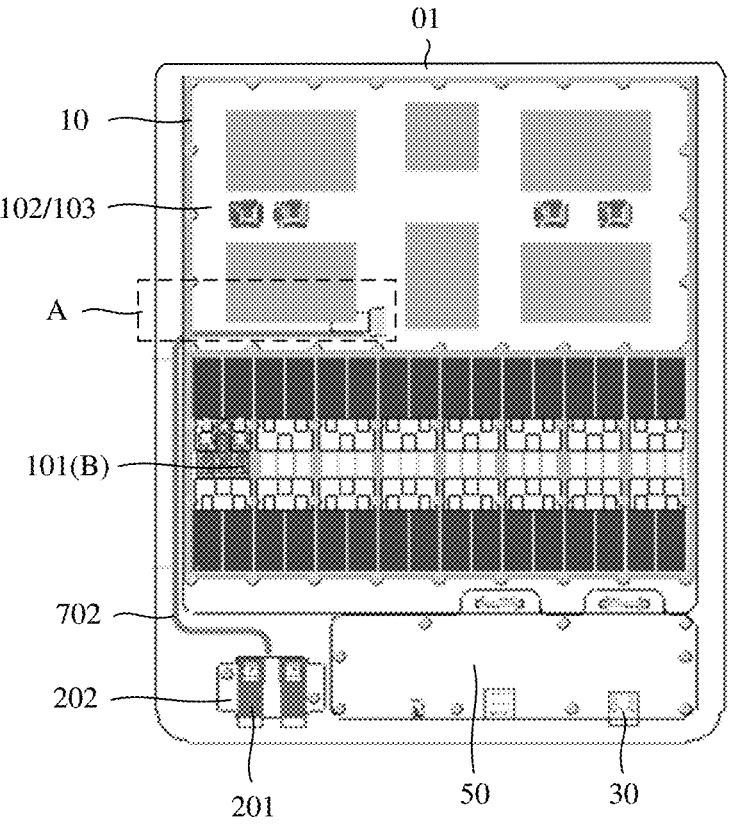
FIG. 10 is a schematic diagram of a still further radio frequency transceiver according to an embodiment of this disclosure.

FIG. 10 is a schematic diagram of further another radio frequency transceiver 01 according to an embodiment of this disclosure.

A PCB 10 is disposed on an upper side of the optical module interface in a vertical direction, and the PCB is divided into a first area and a second area from top to bottom in the vertical direction. An intermediate frequency circuit 102 and a baseband circuit 103 are disposed in the first area, and a second radio frequency power amplifier circuit 101(B) is disposed in the second area.

A difference between the radio frequency transceiver shown in FIG. 10 and FIG. 4 lies in that: the radio frequency transceiver includes only the second radio frequency power amplifier circuit 101(B), and the second radio frequency power amplifier circuit 101(B) is disposed at a bottom of the PCB.

The intermediate frequency circuit 102 is configured to: convert a first baseband signal into a first intermediate frequency signal, transmit the first intermediate frequency signal to the second radio frequency power amplifier circuit 101(B), and convert a second intermediate frequency signal sent by the second radio frequency power amplifier circuit 101(B) into a second baseband signal.

The second radio frequency power amplifier circuit 101 (B) is configured to convert the first intermediate frequency signal into a first radio frequency signal, and convert the received second radio frequency signal into a second intermediate frequency signal.

In this case, the radio frequency transceiver shown in FIG. 10 supports a half of the radio frequency transceiver shown in FIG. 4 to be connected to an antenna, and may be used in a scenario in which a requirement for a wireless communication service is small. In addition, because the second radio frequency power amplifier circuit 101(B) is spaced between the optical module interface and the baseband circuit 103, a temperature of a position of the optical module interface is slightly affected by the baseband circuit. Therefore, a natural heat dissipation manner may be used, a cooling unit in the conventional technology is removed, hardware costs are reduced, and space occupation is reduced.

For the radio frequency transceivers shown in FIG. 7A to FIG. 10, the baseband circuit 103 and the intermediate frequency circuit 102 may be further disposed at a short distance. In this case, a loss requirement can be met even through a PCB-level transmission line is used. Therefore, a CDR circuit that functions as a relay may be removed, to reduce hardware costs. In addition, the power module may be disposed at a position close to the power interface, so that a junction component in the conventional technology can be removed, a power transmission path can be shortened, a loss can be reduced, power leakage can be avoided, and reliability of the power supply can be improved.

The following continues to describe another implementation of the radio frequency transceiver.

Figure 11:
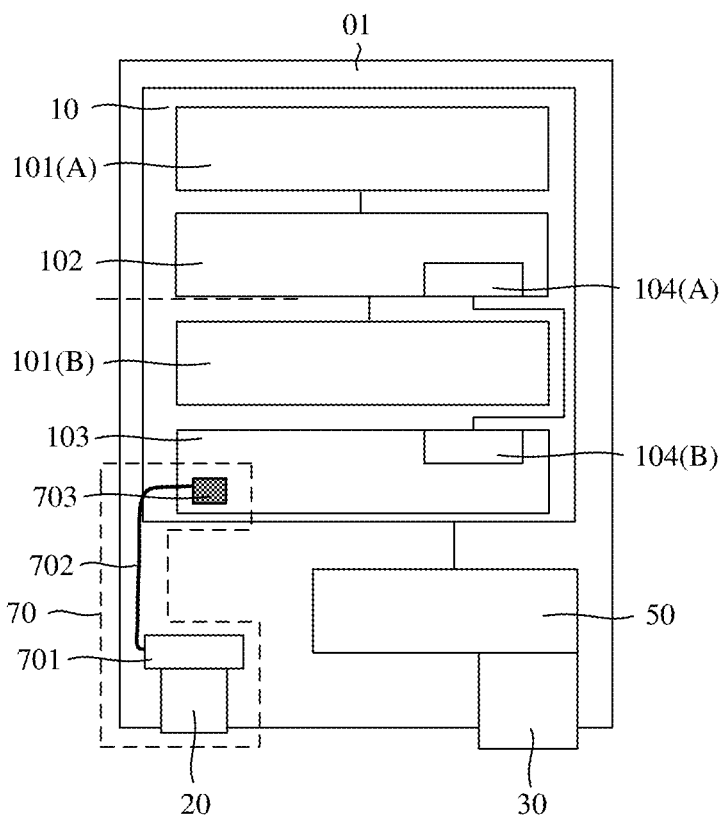
FIG. 11 is a schematic diagram of a yet further radio frequency transceiver according to an embodiment of this disclosure.

FIG. 11 is a schematic diagram of further another radio frequency transceiver 01 according to an embodiment of this disclosure.

A PCB 10 is disposed on an upper side of an optical module interface in a vertical direction, and a lowermost side of the PCB 10 in the vertical direction is higher than a preset height H of the optical module interface. The preset height is not specifically limited in this embodiment of this disclosure. In actual application, the preset height should meet a requirement that the baseband circuit 103 has little impact on an ambient temperature of the optical module interface.

A difference between the radio frequency transceiver shown in FIG. 11 and the radio frequency transceiver shown in FIG. 1 lies in that: the power module 50 originally disposed on the top of the PCB is moved downward to make the power module close to the power interface 30, and the PCB is moved upward to make a robust space between the optical module interface and the baseband circuit 103 on the PCB.

Because there is a robust distance interval between the optical module interface and the baseband circuit 103, a temperature of the position of the optical module interface is slightly affected by the baseband circuit. Therefore, a natural heat dissipation manner may be used, a cooling unit in the conventional technology is removed, and hardware costs are reduced. In addition, a layout of each module of the PCB shown in FIG. 10 is the same as a layout of each module of the PCB shown in FIG. 1. This facilitates reconstruction of an existing radio frequency transceiver and reduces hardware reconstruction costs. In addition, the power module 50 may be disposed at a position close to the power interface 30, so that a junction component in the conventional technology can be removed, a power transmission path can be shortened, a loss can be reduced, power leakage can be avoided, and reliability of the power supply can be improved.

Based on the radio frequency transceiver provided in the foregoing embodiments, an embodiment of this disclosure further provides a connection assembly for a radio frequency transceiver, configured to implement a connection between the optical module interface of the radio frequency transceiver and the baseband circuit. Details are described below.

Continue to refer to a schematic diagram of the connection assembly for the radio frequency transceiver shown in FIG. 5.

The connection assembly includes a fixing plate 202, a limiting device 204, a cable 702, a board-end connector 703, and at least one optical module cage 201.

FIG. 5 is described by using an example in which the connection assembly includes two optical module cages 201. The optical module cage 201 further includes an input/output (I/O) connector (not shown in the figure).

Each optical module cage 201 is configured to connect to an external optical module.

The I/O connector is located in the optical module cage 201, a first end of the I/O connector is configured to connect to the optical module, and a second end of the I/O connector is configured to connect to a first end of the cable 702.

The I/O connector is configured to implement data transmission between the first end of the cable 702 and the optical module.

After the optical module is inserted into the optical module cage 201, a first end of the optical module is connected to an I/O connector in the optical module cage 201, and a second end of the optical module is connected to an upper-level network module through an optical fiber. In a possible implementation, the upper-level network module is a BBU.

The optical module may convert an electrical signal transmitted through the cable 702 into an optical signal, transmit the optical signal to an upper-level network module through an optical fiber, convert an optical signal transmitted by the upper-level network module through the optical fiber into an electrical signal, and transmit the electrical signal to the baseband circuit through the cable 702 and the board-end connector 703.

A first end of the cable 702 is connected to each optical module cage 201, and a second end of the cable 702 is connected to the board-end connector 703.

The limiting device 204 is configured to limit the cable 702. In a possible implementation, the limiting device 204 is configured to fasten a first end side of the cable 702 to the fixing plate 202, to prevent the first end side of the cable 702 from moving, and improve stability of a connection between the cable 702 and each optical module cage 201. In another possible implementation, the limiting device 204 performs coarse positioning on the first end of the cable 702, and the width of the limiting device 204 is greater than the diameter of the cable 70. In this case, the cable 702 passes through the limiting device 204, and the cable 702 can only be moved within a small range, to facilitate adjustment of the cable position.

One or more limiting devices 204 may be disposed. A specific quantity of limiting devices 204 is not limited in this embodiment of this disclosure.

The optical module cage 201 is fastened on the fixing plate 202, and a first positioning hole 203 is further disposed on the fixing plate 202. A fastener such as a screw or a pin is combined with the first positioning hole 203, to fasten the fixing plate 202 at the bottom inside the container of the radio frequency transceiver. A specific quantity of first positioning holes 203 is not limited in this embodiment of this disclosure.

A second positioning hole 7031 is further disposed on the board-end connector 703. The second positioning hole 7031 is configured to limit a relative position between the board-end connector 703 and the container, and is configured to limit a relative position between the board-end connector 703 and the PCB.

In some embodiments, the second fastener is combined with the first part of the second positioning holes 7031 and the third positioning hole in the limiting slot of the container, to limit a relative position between the board-end connector 703 and the limiting slot 801. A specific quantity of second positioning holes 7031 is not limited in this embodiment of this disclosure.

Further, when the PCB is installed in the container, in a possible implementation, a third fastener is disposed on the PCB. The third fastener on the PCB is combined with an unoccupied second positioning hole 7031 on the board-end connector 703, to limit a movement range of the PCB relative to the board-end connector 703.

In another possible implementation, a fourth positioning hole is disposed on the PCB. After the fourth positioning hole on the PCB is aligned with the unoccupied second positioning hole 7031 on the connection assembly 703, the third fastener is inserted into the two positioning holes, to limit a movement range of the board-end connector relative to the PCB. A quantity of fourth positioning holes is not specifically limited in this embodiment of this disclosure.

The connection assembly 703 includes a non-signal end face 7032 and a signal end face 7033. The non-signal end face 7032 is opposite to the signal end face 7033. The non-signal end face 7032 does not include a signal terminal.

The signal end face 7033 includes a signal terminal, and the signal terminal is configured to connect to a signal terminal on the PCB.

In some embodiments, the signal terminal of the signal end face 7033 is configured to connect to the signal terminal of the PCB in a crimping manner. To ensure reliability of a connection between the signal terminal of the signal end face 7033 and the signal terminal of the PCB, the foregoing third fastener is a screw, and the signal terminals on the two sides are fastened through the screw.

In some other embodiments, the signal terminal of the signal end face 7033 is connected to the signal terminal of the PCB in an inserting manner. For example, the signal terminal of the signal end face 7033 is a male end, and the signal terminal of the PCB is a female end; or the signal terminal of the signal end face 7033 is a female end, and the signal terminal of the PCB is a male end. The male end and the female end are correspondingly connected in an inserting manner.

In still other possible implementations, at least one fifth positioning hole is further disposed in an area, in which the baseband circuit is disposed, on the PCB, and the board-end connector further includes at least one sixth positioning hole 7035. The fifth positioning hole and the sixth positioning hole 7035 are configured to be combined with a screw to fasten the board-end connector and the PCB. After the board-end connector and the PCB are fastened tightly by using the screw, the signal terminal on the signal end face 7033 can be tightly connected to the signal terminal on the PCB.

The cable 702 is a low-loss transmission line and has good electromagnetic shielding performance. Because the cable 702 may have a specific length, the optical module interface and the baseband circuit may be connected in a long distance, that is, a layout constraint of the baseband circuit and the optical module interface is decoupled, so that a layout of the baseband circuit may be more flexible. When a specific distance exists between the baseband circuit and the optical module interface, heat generated by the baseband circuit does not affect working of the optical module inserted into the optical module interface. On one hand, stability of the optical module interface and the optical module is improved, and on the other hand, the cooling unit may be removed, thereby reducing hardware costs and saving layout space.

In addition, the connection assembly provided in this embodiment of this disclosure may be further used in another device that performs conversion between an optical signal and an electrical signal, for example, may be further used in a network switch or a server cluster in a data center.

Based on the radio frequency transceiver provided in the foregoing embodiments, an embodiment of this disclosure further provides a radio frequency transceiver system to which the radio frequency transceiver is applied. The following provides specific descriptions with reference to the accompanying drawings.

Figure 12:
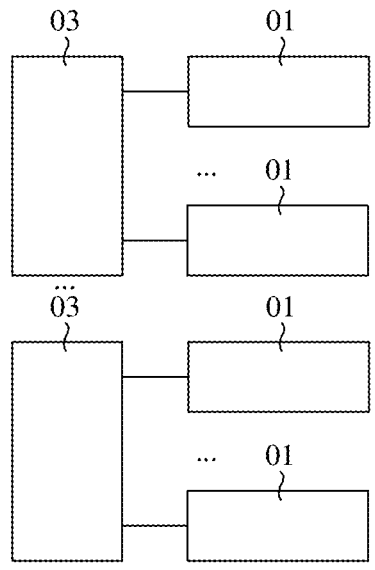
FIG. 12 is a schematic diagram of a radio frequency transceiver system according to an embodiment of this disclosure.

FIG. 12 is a schematic diagram of a radio frequency transceiver system according to an embodiment of this disclosure.

The radio frequency transceiver system provided in this embodiment of this disclosure includes a radio frequency transceiver 01 and a BBU 03.

In actual application, the radio frequency transceiver system generally includes at least one radio frequency transceiver 01 and a plurality of BBUs 03. One BBU 03 can simultaneously access a plurality of radio frequency transceivers 01. A specific quantity of radio frequency transceivers 01 simultaneously accessed by one BBU 03 is not limited in this embodiment of this disclosure.

When the radio frequency transceiver system includes the plurality of BBUs 03, quantities of radio frequency transceivers 01 connected to the BBUs 03 may be the same or may be different. This is not specifically limited in this embodiment of this disclosure.

The radio frequency transceiver 01 communicates with the BBU 03 through an optical fiber, and the radio frequency transceiver 01 supports a MIMO function. On one hand, the radio frequency transceiver 01 obtains, through the optical fiber, an optical signal sent by the BBU, converts the optical signal into a high-speed electrical signal by using an optical module, processes the high-speed electrical signal by using an internal baseband circuit and a radio frequency power amplifier circuit, and sends the high-speed electrical signal to a plurality of user equipment through a plurality of transmit antennas. On the other hand, the radio frequency transceiver 01 can receive, through the plurality of e receive antennas, radio frequency signals sent by the plurality of user equipment, convert the radio frequency signals into high-speed electrical signals after being processed by an internal radio frequency power amplifier circuit and a baseband circuit, convert the high-speed electrical signals into optical signals by using an optical module, and transmit the optical signals to the BBU 03 through the optical fiber.

For a specific implementation and a working principle of the radio frequency transceiver 01, refer to related descriptions in the foregoing embodiments. Details are not described herein again in this embodiment of this disclosure.

In conclusion, the radio frequency transceiver provided in this embodiment of this disclosure implements an electrical connection between the optical module interface and the baseband circuit through the connection assembly. Because a cable may have a specific length, the optical module interface and the baseband circuit may be spaced by a specific distance. This overcomes a constraint on a circuit module layout when the optical module interface and the baseband circuit are connected through a PCB-level transmission line, so that a circuit layout on the PCB can be more flexible. Because the optical module interface may be spaced from the baseband circuit, and is not in contact with the PCB, a temperature of a position where the optical module interface is located is slightly affected by heat generated by the baseband circuit. Therefore, a natural heat dissipation manner may be used, and a cooling unit configured to dissipate heat of the optical module interface is removed, thereby reducing hardware costs and reducing space occupation.

Further, the baseband circuit and the intermediate frequency circuit may be further disposed at a close distance. In this case, even if the baseband circuit and the intermediate frequency circuit are connected through the cable of the PCB, a requirement of a low transmission loss can be met. Therefore, a CDR circuit with a relay function can be removed, to reduce costs and save occupied layout space. In addition, because the baseband circuit is decoupled from the optical module interface, and the baseband circuit is disposed upward, robust space may be left at the bottom of the container of the radio frequency transceiver for disposing, and the power module may be disposed. To be specific, the power module may be disposed at a position close to the power interface. Therefore, a junction component may be removed, a power transmission path may be shortened, loss may be reduced, power leakage may be avoided, and reliability of the power supply is improved.

A radio frequency (RF) in embodiments of this disclosure refers to an electromagnetic frequency that can be radiated to space, and a frequency range is from 300 kHz to 300 GHz. This is not specifically limited in embodiments of this disclosure.

It should be understood that, in this disclosure, "at least one (item)" refers to one or more, and "a plurality of" refers to two or more. The term "and/or" is used to describe an association relationship between associated objects, and indicates that three relationships may exist.

The foregoing is merely specific implementation of this disclosure. It should be noted that a person of ordinary skill in the art may further make improvements and refinements without departing from the principles of this disclosure. These improvements and refinements shall also fall within the protection scope of this disclosure.

What is claimed is:

1. A radio frequency transceiver configured to transmit a first baseband signal and receive a second baseband signal, the radio frequency transceiver comprising:

a container comprising a circuit board and a connection assembly, and a baseband circuit disposed on the circuit board; wherein:

the baseband circuit is configured to synthesize the first baseband signal, and decode the second baseband signal;

the connection assembly comprises a board-end connector, a cable, and at least one optical module interface;

the board-end connector is configured to connect to the baseband circuit;

a first end of the cable is configured to connect to the at least one optical module interface, and a second end of the cable is configured to connect to the board-end connector; and each of the at least one optical module interface is configured to connect to an external optical module.

2. The radio frequency transceiver according to claim 1, wherein the optical module interface is disposed at a bottom inside of the container, the circuit board is disposed on an upper side of the optical module interface in a vertical direction, and the circuit board is divided into a first area, a second area, and a third area from top to bottom in the vertical direction; and the baseband circuit is disposed in the second area.

3. The radio frequency transceiver according to claim 2, wherein a first radio frequency power amplifier circuit is disposed in the first area, an intermediate frequency circuit is disposed in the second area, and a second radio frequency power amplifier circuit is disposed in the third area;

the intermediate frequency circuit is configured to: convert the first baseband signal into a first intermediate frequency signal, transmit the first intermediate frequency signal to the first radio frequency power amplifier circuit and the second radio frequency power amplifier circuit, and convert a second intermediate frequency signal sent by the first radio frequency power amplifier circuit and the second radio frequency power amplifier circuit into the second baseband signal; and the first radio frequency power amplifier circuit and the second radio frequency power amplifier circuit are configured to convert the first intermediate frequency signal into a first radio frequency signal, and convert a received second radio frequency signal into the second intermediate frequency signal.

4. The radio frequency transceiver according to claim 2, wherein a first radio frequency power amplifier circuit is disposed in the first area, and an intermediate frequency circuit is disposed in the second area;

the intermediate frequency circuit is configured to: convert the first baseband signal into a first intermediate frequency signal, transmit the first intermediate frequency signal to the first radio frequency power amplifier circuit, and convert a second intermediate frequency signal sent by the first radio frequency power amplifier circuit into the second baseband signal; and the first radio frequency power amplifier circuit is configured to convert the first intermediate frequency signal into a first radio frequency signal, and convert a received second radio frequency signal into the second intermediate frequency signal.

5. The radio frequency transceiver according to claim 1, wherein the optical module interface is disposed at a bottom inside of the container, the circuit board is disposed on an upper side of the optical module interface in a vertical direction, and the circuit board is divided into a first area and a second area from top to bottom in the vertical direction;

the baseband circuit is disposed in the second area; and a lowermost side of the circuit board has a position higher than the optical module interface in the vertical direction.

6. The radio frequency transceiver according to claim 5, wherein a first radio frequency power amplifier circuit is disposed in the first area, and an intermediate frequency circuit is disposed in the second area;

the intermediate frequency circuit is configured to: convert the first baseband signal into a first intermediate frequency signal, transmit the first intermediate frequency signal to the first radio frequency power amplifier circuit, and convert a second intermediate frequency signal sent by the first radio frequency power amplifier circuit into the second baseband signal; and the first radio frequency power amplifier circuit is configured to convert the first intermediate frequency signal into a first radio frequency signal, and convert a received second radio frequency signal into the second intermediate frequency signal.

7. The radio frequency transceiver according to claim 6, wherein the intermediate frequency circuit and the baseband circuit are connected in the second area.

8. The radio frequency transceiver according to claim 1, wherein the optical module interface is disposed at a bottom inside of the container, the circuit board is disposed on an upper side of the optical module interface in a vertical direction, and the circuit board is divided into a first area and a second area from top to bottom in the vertical direction; and the baseband circuit is disposed in the first area.

9. The radio frequency transceiver according to claim 8, wherein an intermediate frequency circuit is disposed in the first area, and a second radio frequency power amplifier circuit is disposed in the second area;

the intermediate frequency circuit is configured to: convert the first baseband signal into a first intermediate frequency signal, transmit the first intermediate frequency signal to the second radio frequency power amplifier circuit, and convert a second intermediate frequency signal sent by the second radio frequency power amplifier circuit into the second baseband signal; and the second radio frequency power amplifier circuit is configured to convert the first intermediate frequency signal into a first radio frequency signal, and convert a received second radio frequency signal into the second intermediate frequency signal.

10. The radio frequency transceiver according to claim 9, wherein the intermediate frequency circuit and the baseband circuit are connected in the first area.

11. The radio frequency transceiver according to claim 1, wherein the optical module interface is disposed at a bottom inside of the container, the circuit board is disposed on an upper side of the optical module interface in a vertical direction, and a lowermost side of the circuit board has a position higher than the optical module interface in the vertical direction.

12. A connection assembly for use in a radio frequency transceiver, the connection assembly comprising:

a board-end connector, a cable, and at least one optical module interface; wherein:

a first end of the cable is configured to connect to the at least one optical module interface, and a second end of the cable is configured to connect to the board-end connector;

the board-end connector is configured to connect to a baseband circuit on a circuit board of the radio frequency transceiver; and each of the at least one optical module interface is configured to connect to an external optical module.

13. The connection assembly according to claim 12, wherein each of the at least one optical module interface comprises an optical module cage and an input/output connector;

each optical module cage is configured to connect to the optical module;

the input/output connector is located in the optical module cage, a first end of the input/output connector is connected to the optical module, and a second end of the input/output connector is connected to the first end of the cable; and the input/output connector is configured to implement data transmission between the first end of the cable and the optical module.

14. The connection assembly according to claim 13, wherein the connection assembly further comprises a fixing plate, and at least one limiting device and at least one positioning hole are disposed on the fixing plate;

the optical module cage is disposed on the fixing plate;

the at least one limiting device is configured to fasten the first end of the cable on the fixing plate, or is configured to limit a movement range of the first end of the cable on the fixing plate; and the at least one positioning hole is configured to be combined with a fastener to fasten the fixing plate to the bottom inside of a container of the radio frequency transceiver.

15. The connection assembly according to claim 12, wherein the board-end connector comprises at least two positioning holes; and a first part of the at least two positioning holes is configured to be combined with a fastener and at least one second positioning hole disposed in a limiting slot, to limit a movement range of the board-end connector in the limiting slot, wherein the limiting slot is disposed in a position that corresponds to the baseband circuit and that is in a container of the radio frequency transceiver.

16. The connection assembly according to claim 15, wherein a second part of the at least two positioning holes are configured to be combined with another fastener in an area, in which the baseband circuit is disposed, on the circuit board, to limit a movement range of the board-end connector relative to the circuit board.

17. The connection assembly according to claim 16, wherein the board-end connector further comprises at least one fourth positioning hole; and the at least one fourth positioning hole is configured to be combined with a screw and at least one third positioning hole disposed in an area, in which the baseband circuit is disposed, on the circuit board, to fasten the board-end connector and the circuit board.

18. The connection assembly according to claim 16, wherein the board-end connector comprises a signal end face, and a signal terminal is disposed on the signal end face; and when the board-end connector is fastened to the circuit board, the signal terminal is configured to correspondingly connect to a signal terminal on the circuit board.

19. The connection assembly according to claim 15, wherein a second part of the at least two positioning holes are configured to be combined with another fastener and a third positioning hole in an area, in which the baseband circuit is disposed, on the circuit board, to limit a movement range of the board-end connector relative to the circuit board.

20. A radio frequency transceiver system comprising:

at least one radio frequency transceiver configured to transmit a first baseband signal and receive a second baseband signal, the at least one radio frequency transceiver comprising:

a container comprising a circuit board and a connection assembly, and a baseband circuit disposed on the circuit board; wherein:

the baseband circuit is configured to synthesize the first baseband signal, and decode the second baseband signal;

the connection assembly comprises a board-end connector, a cable, and at least one optical module interface;

the board-end connector is configured to connect to the baseband circuit;

a first end of the cable is configured to connect to the at least one optical module interface, and a second end of the cable is configured to connect to the board-end connector; and each of the at least one optical module interface is configured to connect to an external optical module, and wherein:

the radio frequency transceiver system further comprises a baseband processing unit (BBU);

the BBU is connected to the at least one radio frequency transceiver through an optical fiber; and the BBU is configured to process first data transmitted by the at least one radio frequency transceiver, and transmit second data to the at least one radio frequency transceiver.

* * * * *